June 6, 1950 E. G. MAU 2,510,238
SINK GUARD
Filed May 11, 1946 2 Sheets-Sheet 1
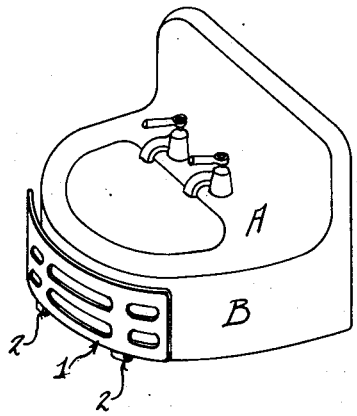
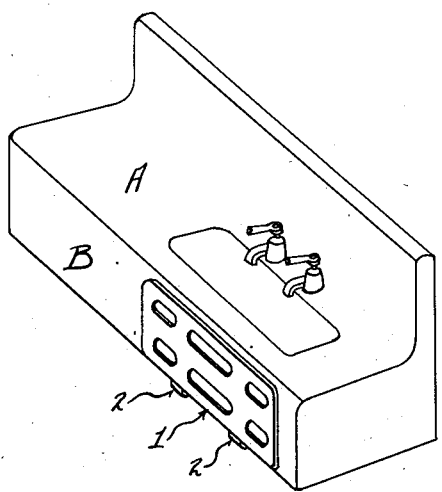
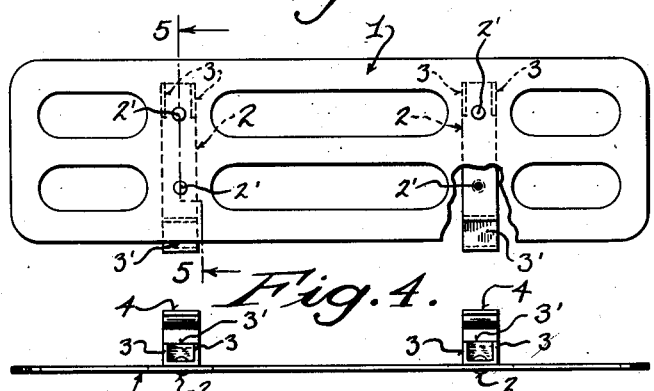
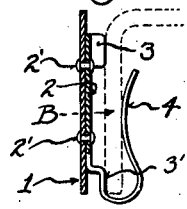
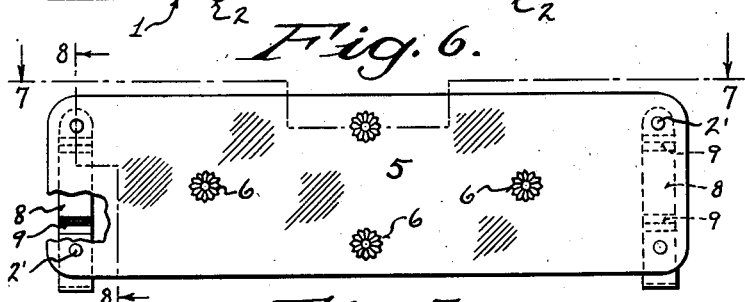
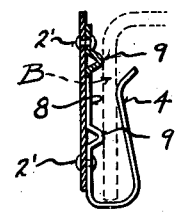
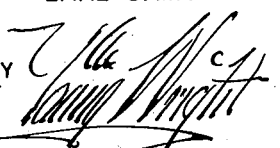
INVENTOR
EARL G. MAU
BY
ATTORNEYS

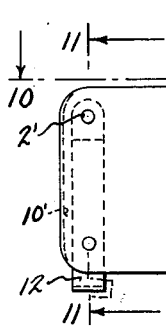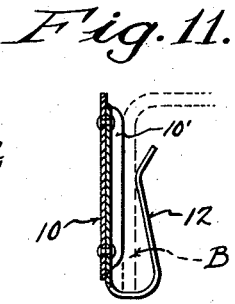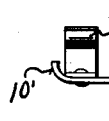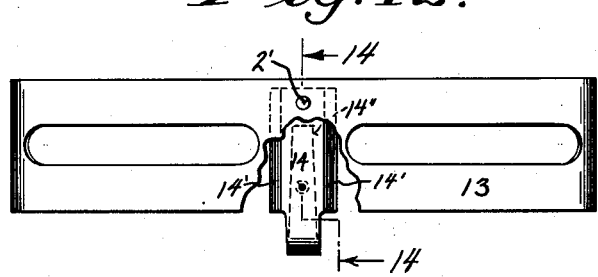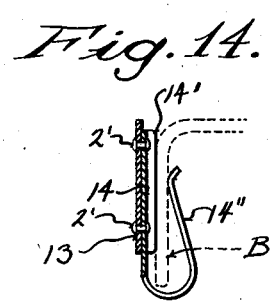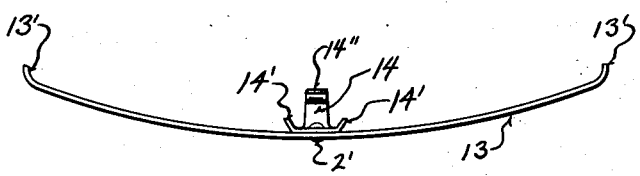

Patented June 6, 1950

2,510,238

UNITED STATES PATENT OFFICE 2,510,238

SINK GUARD

Earl G. Mau, Racine, Wis.

Application May 11, 1946, Serial No. 669,142

2 Claims. (Cl. 4—187)

My invention has for its primary object to provide a simple and effective shield or guard attachment to basins, either of the rectangular or circular type, the guard being provided with clips for attachment to the flange or apron of either a wash basin or sink, whereby the guard is spaced slightly from the apron to protect garments against drippage of moisture.

A further object of my invention is to provide guards of the skeleton or solid type and also a guard composed of flexible plastic material, whereby it may be fitted either to a curved surface or flat surfaced apron.

It should be understood that this shield or guard is primarily intended to protect the approximate waistline of a housewife working about a sink, and under these conditions the apron of a sink is more or less saturated with moisture, and consequently when the portions of the body come in contact with a moist apron they will in practice soil the same and, hence, the protecting element is to overcome this objectional result to the operator.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 represents a perspective view of a wash basin of curved formation.

Figure 2 is a sink basin of rectangular formation.

Figure 3 is a face view of a skeleton flat guard.

Figure 4 is a plan view of the same.

Figure 5 is a cross section of said guard, a section being indicated by line 5—5 of Figure 3.

Figure 6 is a face view of a solid and flexible form of guard being of the plastic type.

Figure 9 is a face view of still another solid form of my invention.

Figure 10 is a sectional plan view of the same, the section being indicated by line 10—10, of Figure 9.

Figure 11 is a cross section of said guard, the section being indicated by line 11—11 of Figure 9.

Figure 12 is a face view of still another form of my invention wherein a single clip is utilized for attaching the same.

Figure 13 is a plan view of the same, and

Figure 14 is a cross section of said guard, the section being indicated by line 14—14 of Figure 12.

Referring by characters to the drawing A indicates a wash basin of circular form having a depending apron flange B of the web type. Fitted to the outer face of the apron B is a curved guard 1, of the skeleton type, the guard is attached by a pair of open mouth clips 2—2, which clips are secured to the guard by rivets 2'.

The upper ends of the clips have downwardly extended ears or lugs 3, and at the base of said clips the same are offset to form a lug 3', which lug is in vertical alignment with the lug 3. From this offset lug 3' the clip terminates with a spring jaw 4, forming an open mouth, with reference to the base of the clip.

As best illustrated in Figure 5 of the drawings, when it is desired to insert the guard it is only necessary to slip the same about the flanged apron B, as indicated in dotted lines. In this position it will be noted that the guard is frictionally held to the apron and the spring jaw, thus engaging the inner surface over said apron, will cause the flanges 3 and 3' to engage the outer surface of said apron, whereby a parallel drainage space is developed between the outer face of the apron and said guard. Hence, garments coming in contact with the guard will be protected against moisture or drainage.

As will be noted, the flat guard just described is attached to the rectangular sink basin shown in Figure 2 of the drawing.

Referring to Figures 6 to 8 inclusive, the guard strip 5 is composed of a solid plate or sheet of flexible plastic material, which material may be furnished in various colors to harmonize with the ornamental plumbing or other features.

apron and plate in this instance, I attached to the intermediate portions of the plate a plurality of outer rosettes 6—6, having shanks extending through apertures of the guard and secured to spacing buttons or lugs 7—7.

Adjacent the ends of this guard the base portions 8 of spring clips are riveted to said guard. The base portion of each clip is provided with a pair of offset lugs 9—9, which lugs correspond and are aligned with the lugs 7—7. In this exemplification of my invention the color of the guards may be varied, as stated, and also the color of the rosettes 6, whereby an ornamental, pleasing, guard protector results, it being understood, that this guard is slipped upon the basin apron, similar to that previously described, and is held spaced from the outer face of the apron by the series of lugs.

Referring to Figures 9 to 10 inclusive, a solid form of straight guard 10 is illustrated. The ends of this guard are bowed inwardly to form stop lugs 10', and the intermediate portion of the guard is provided with a series of punctures, wherein the punctured material is folded inwardly to form lugs 11—11 for spacing purposes. The ends of the guard plate 10 have riveted thereto a simple pair of spring clips 12—12, whereby the guard is drawn tightly to the face of the apron when the clips are pushed upwardly upon said apron, as shown in Figure 11.

Referring now to still another modified form of my invention, Figures 12 to 14 of the drawings illustrate a simple skeleton form of curved guard 13, which guard is provided with inturned flanges at its ends to form stop lugs 13', as best shown in Figure 13 of the drawing.

A single clip having its base 14 riveted to the center of the same is provided in this instance, and said base has its vertical edges folded inwardly to form parallel flange lugs 14', which lugs are in the same plane as the end lugs 13'. The open mouth spring jaw 14" in this case is similar to that previously described and grasps the guard firmly, bearing in mind that the transverse flange lugs 13' are of sufficient area to prevent twisting of the guard.

I claim:

1. A waistline garment protector for basins, comprising a plate adapted to be fitted to the face of the basin apron, an open mouth spring clip carried by the plate for engagement with the faces of the basin apron and spacing lugs extending from the clip base for engagement with the apron, whereby the aforesaid plate is offset from the apron face to protect the clothing of a user about the waistline against moisture from said apron.

2. A waistline garment protector for basins, comprising a flexible plate adapted to be fitted to the basin apron, open mouthed spring clips carried by the plate for engagement with the faces of the basin apron for spacing buttons positioned about and carried by the plate for engagement with the outer face of the basin apron, whereby the offset plate serves to protect the clothing of the user against moisture about the waistline.

EARL G. MAU.

REFERENCES CITED

The following references are of record in the file of this patent:

UNITED STATES PATENTS

| Number | Name | Date |
| --- | --- | --- |
| 222,846 | Stevens | Dec. 23, 1879 |
| 685,341 | McHale | Oct. 29, 1901 |
| 1,218,922 | Bass | Mar. 13, 1917 |
| 1,221,137 | Carney | Apr. 3, 1917 |
| 1,234,658 | Gray | July 24, 1917 |
| 1,985,658 | Heise et al. | Dec. 25, 1934 |
| 2,131,111 | Marsh | Sept. 27, 1938 |

FOREIGN PATENTS

| Number | Country | Date |
| --- | --- | --- |
| 792,041 | France | Dec. 21, 1935 |